AGENT

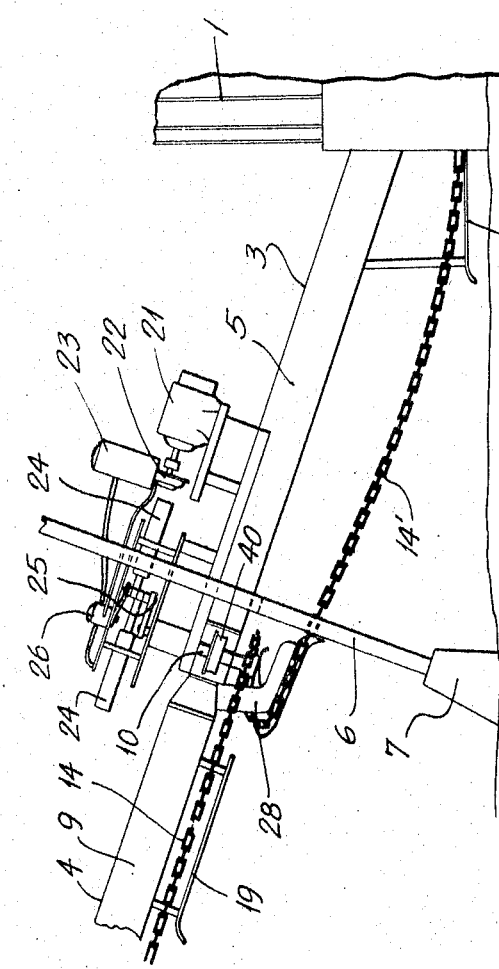
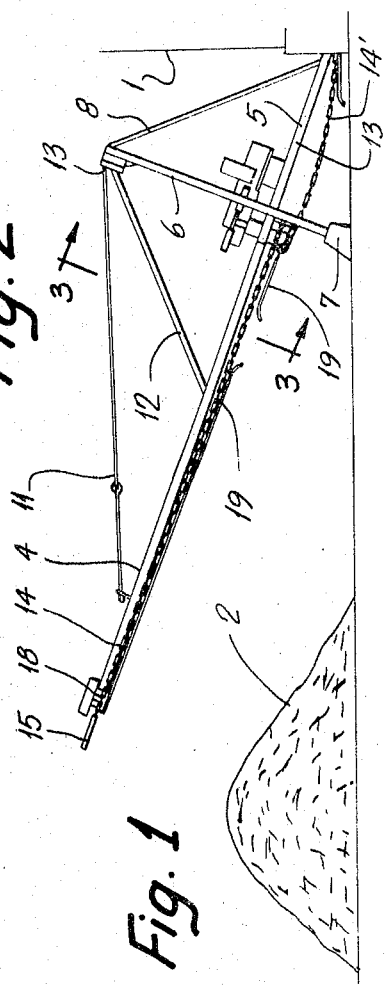
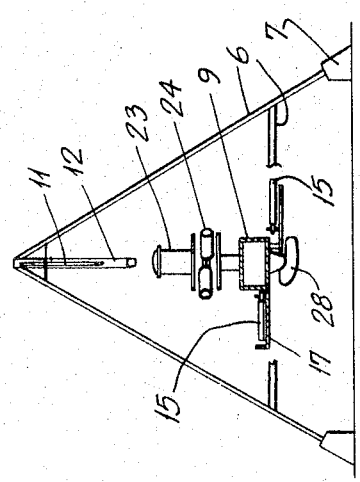
INVENTORS
Georges LACOSTE
Elphege PETIT
Donatien RACICOT
Hector VINCENT
By Pierre Lespérance
AGENT INVENTORS
Georges LACOSTE
Elphege PETIT
Donatien RACICOT
Hector VINCENT By Pierre Lespérance

Jan. 17, 1967
G. LACOSTE ETAL
SWINGING DISCHARGE CONVEYOR FOR
STABLE-CLEANING APPARATUS
3,298,496
Filed Nov. 5, 1965
4 Sheets-Sheet 4
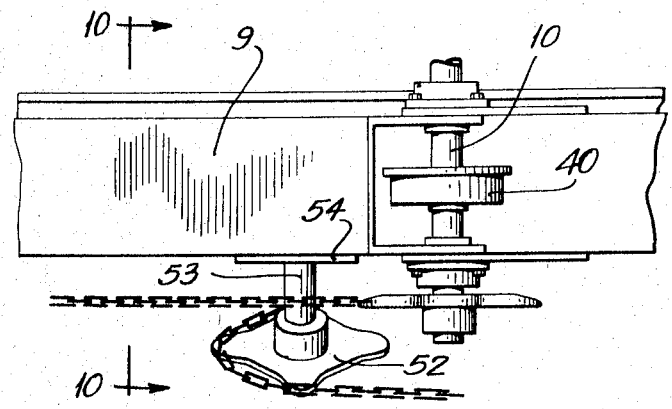
Fig. 9
Fig. 10
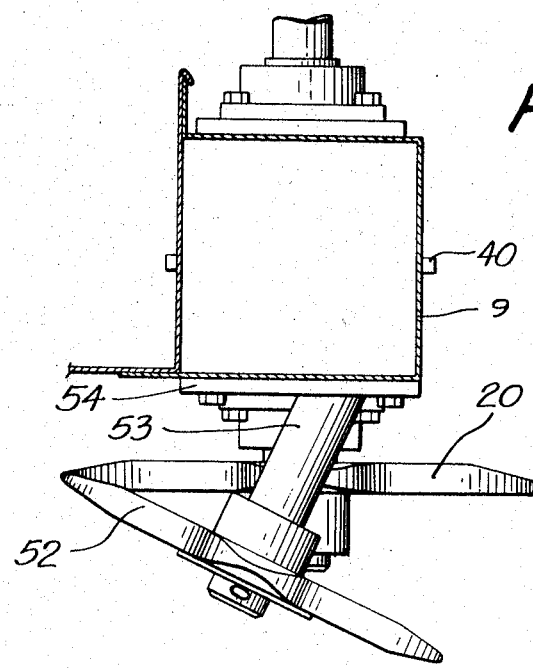
INVENTORS
Georges LACOSTE
Elphege PETIT
Donatien RACICOT
Hector VINCENT
By Pierre Lesperance
AGENT 3,298,496
SWINGING DISCHARGE CONVEYOR FOR
STABLE-CLEANING APPARATUS
Georges Lacoste, St. Jean-Baptiste de Rouville, Elphège Petit, St. Valerien, Donatien Racicot, St. Paul d'Abbotsford, and Hector Vincent, St. Valerien, all of Quebec, Canada, assignors to La Cie Hydrolic Vincent Ltee, St. Valerien, Quebec, Canada
Filed Nov. 5, 1965, Ser. No. 506,536
Claims priority, application Canada, Nov. 21, 1964, 917,015
16 Claims. (Cl. 198—124)

The present invention relates to stable-cleaning apparatus and, more particularly, to the discharge system of the apparatus.

It is known in stable-cleaning apparatus to provide at the exterior of the stable, a two-part conveyor, the outer part of which can be swung in order to discharge the manure over a larger surface and thus prevent the formation of too high a manure stack requiring spreading out, which is a difficult and time-consuming operation, especially in a winter-time when the manure is frozen.

In discharge conveyors of the non-swinging type, the driving means for the stable-cleaning chain are normally mounted at the free upper end of the inclined discharge trough.

In discharge conveyors of the swinging type, the driving means for the chain are normally mounted on the stationary part of the inclined trough and the chain forms its end loop at said driving means: this conventional arrangement requires a second conveyor chain for the swinging trough, together driving motor means for said second chain mounted at the upper outer end of the swinging trough.

The above-noted location of the driving means for the conveyor chain is necessary in order to exert on the chain a traction over the entire length of the chain run which carries the manure. However, in the case of the discharge conveyor of the swinging type, the above-noted location of the driving means results in a considerable increase in the cost of manufacture of the swinging conveyor and also in the improper functioning of the latter, and in difficulties encountered when changing the angular position of the swinging conveyor.

The general object of the present invention resides, therefore, in the provision of a discharge conveyor of the swinging type for stable-cleaning apparatus, which will obviate the above-noted disadvantages, being of relatively simple construction and enabling fast and easy swinging of the conveyor.

Yet another object of the present invention resides in the provision of a stable-cleaning apparatus provided with a discharge portion of the swinging type, in which a single endless chain serves for the entire conveyor, including the swinging portion thereof, the driving motor means to move the chain being mounted on the fixed part of the conveyor system at the point of pivoting of the swinging part.

Yet another object of the present invention resides in the provision of a system of the character described, in which the power-operated driving means for the chain include a sprocket wheel engaging the chain over at least one-half turn, the chain thereafter leaving the sprocket wheel to make another half-turn which crosses the portion of the chain about to mesh with the sprocket wheel, means being moreover provided for positively disengaging the chain from the sprocket wheel and for directing said chain downwardly in order to prevent contact between the intersecting portions of the chain.

Another object of the present invention resides in the provision of power-operated means which can be remote control to pivot the swinging portion of the conveyor to any desired angular position.

The foregoing and other important objects of the present invention will become clearer by referring to the description and to the annexed drawings, in which:

FIGURE 1 is a somewhat schematic side elevation of the system in accordance with the invention;

FIGURE 2 is a partial side elevation of the system shown in FIGURE 1, but on an enlarged scale;

FIGURE 3 is a section taken along line 3—3 of FIGURE 1;

FIGURE 9 is a view similar to that of FIGURES 5 and 7, but showing yet another embodiment of the system for disengaging the chain from the driving sprocket and for deviating said chain; and FIGURE 10 is a cross-section, taken along the line 10—10 of FIGURE 9.

Figure 4:
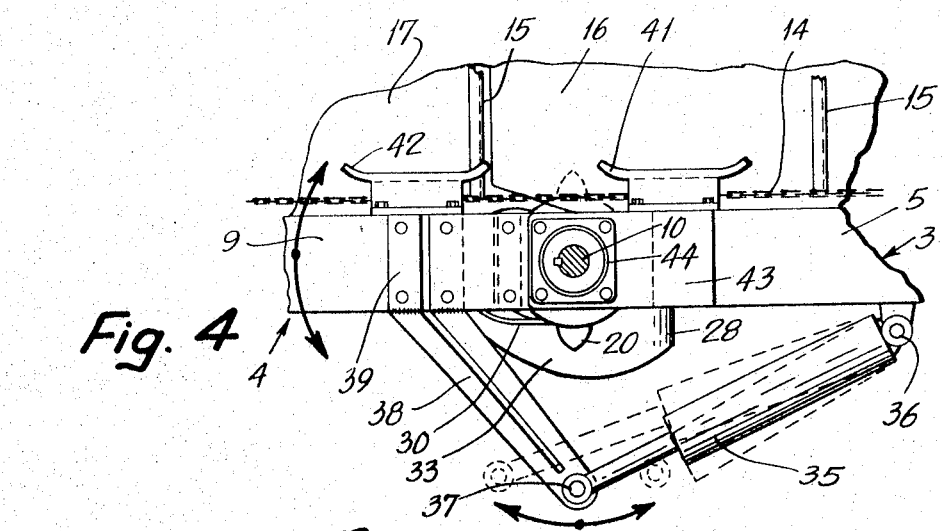
FIGURE 4 is a partial top plan view, partially in section, of the pivotally interconnected portions of the swinging conveyor system.

Referring to the drawings in which like reference characters indicate like elements throughout, there is shown in FIGURES 1 and 2 a portion of a stable 1 provided with a stable-cleaning apparatus, the parts of which, exterior to stable 1, serving to discharge the manure to form a heap, shown at 2.

The portion of the stable-cleaning apparatus exterior to stable 1 comprises a stationary part, generally indicated at 3, and a swinging part, generally indicated at 4, part 4 being pivotally connected to part 3 in order to change the location of discharge of of the manure in order to form a manure heap 2 having a larger base and a smaller height than is possible with a conveyor of the non-swinging type.

The stationary part 3 comprises a beam 5, inclined upwardly and outwardly and the upper end of which is supported by an A-shaped frame 6 disposed in a plane perpendicular to beam 5 and the inclined legs of which being anchored within and supported by ground-engaging concrete bases 7.

A longitudinally inclined tie-rod 8 is attached to the apex of the A-frame 6 and to the lower portion of beam 5.

The swinging portion 4 of the discharge conveyor consists of a beam 9, which is pivoted at one end to the outer end of beam 5 about the axis of a driving shaft 10.

Beam 9 is supported in an upwardly and outwardly inclined position by tie-rods 11 and 12, which are pivoted at 13 to the apex of A-frame 6 about an axis co-axial with the axis of driving shaft 10.

The stable-cleaning apparatus comprises a conveyor chain, generally indicated at 14, and which is provided with transversely extending scraper blades 15.

The active run of the chain, the blades 15 of which carry the manure, is supported by and moves within a trough, made of two sections, 16 and 17, respectively, section 16 being secured to the stationary beam 5 at one side thereof, as shown in FIGURE 4, and section 17 being secured to beam 9 of the swinging part 4, the trough sections 16 and 17 being mounted on the same sides of the two beams 5 and 9 and overlapping each other in the region of the driving shaft 10 and therefore of the pivot of the swinging part 4. Therefore, manure is carried by the chain 14 and scraper blades 15 along trough sections 16 and 17 up to the upper-outer end of the swinging part 4, where it is discharged, and chain 14 returns around idle pulley 18 on the opposite side of beam 9, being guided by guiding element 19 until it meshes with a driving sprocket wheel 20 secured to driving shaft 10 and disposed below beams 5 and 9.

Driving shaft 10 is rotated by a drive system, of any desired type, mounted on the outer end of stationary beam 5, but it is preferred to use a hydraulic drive such as described and claimed in U.S. Patent 3,182,455 dated May 11, 1965 and entitled: "Hydraulic drive," whose inventor is Donatien Racicot, one of the co-inventors of the present application.

U.S. Patent 3,217,774 dated November 16, 1965, by Donatien Racicot, describes a rotary valve used in the hydraulic drive above mentioned. This hydraulic drive comprises an electric motor 21 actuating a hydraulic pump 22 connected to a hydraulic fluid reservoir 23. The hydraulic pump supplies fluid under pressure to three hydraulic cylinders 24, the piston rods of which drive a crank shaft 25 secured to the driving shaft 10, the cylinders 24 being controled by a rotary valve 26, the construction of which is described in the last-named patent relating to a rotary valve.

Chain 14 is positively pulled by sprocket wheel 20 and makes a half-turn in meshing engagement with the latter, and the return run of the chain, indicated at 14', moves back into stable 1, being guided and supported by guiding element 27. The chain 14 meshes with the sprocket wheel 20 for about one-half turn, in order that the sprocket wheel 20 may exert the required pull on the chain without the latter jumping the teeth of wheel 20. The chain then clears the sprocket wheel and crosses the run of the chain which is under traction, to thereafter form the return portion 14'.

In order to guide chain in its last half-turn and to disengage the chain from the sprocket wheel in a positive manner, there is provided just forwardly of the sprocket wheel a chain guiding and deviating element 28, which is secured to and underneath the swinging beam 9 just ahead of the drive shaft 10.

Element 28, according to the first embodiment, consists of a guiding plate, of generally U-shaped cross-section, having an inlet leg 29 and an outlet leg 30 interconnected by bight portion 31. The bight 31 is convex and is inclined downwardly and rearwardly to about an angle of 20 degrees with respect to the drive shaft 10. The inlet leg 29 is higher than the outlet leg 30 and the bight 31 is provided with a notch 32 for clearing the teeth of sprocket wheel 20.

The upper edge of the legs 29 and 30 is located below the sprocket wheel 20. Element 28 is furthermore provided with an outwardly directed flange 33, at the lower edge thereof, and which is disposed in accordance with a spiral inclined downwardly in the direction from the inlet branch 29 to the outlet branch 30.

Figure 6:
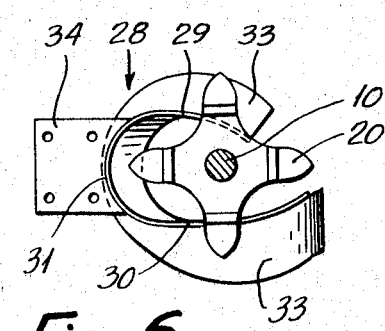
FIGURE 6 is a top plan view of the sprocket wheel for driving the chain and of the guiding element for disengaging and deviating the chain, the shaft of the wheel being shown in cross-section.

Fixing plate 34 is an extension of bight portion 31 and serves to secure element 28 underneath beam 9. The free end of inlet leg 29 is disposed vertically underneath the circular path described by the bottom of the trough between the teeth of sprocket wheel 20, as shown in FIGURE 6.

From this point, the inlet leg 29 progressively moves away from shaft 10 and merges with bight portion 31 which is disposed radially outwardly from the tip of the teeth of the sprocket wheel.

The outlet leg 30 moves in turn progressively radially towards the shaft 10 in the direction of its outer end.

The chain links mesh with the teeth of the sprocket wheel and the latter exerts a traction on the chain. The chain makes a complete half-turn around the sprocket wheel, then is engaged by the inlet leg 29 and slides over the latter. The inlet leg causes removal of the chain from the tooth of the sprocket wheel in a positive manner, said tooth meanwhile moving within the notch 32 of bight 31.

The chain slides over the bight portion 31 which, due to the vertical inclination of the latter, is deviated downwardly in a positive manner, whereby the chain can cross the active run of the chain without the scraping blades on the return run touching the scraping blades on the active run. The return run of the chain finally rests on and is guided by flange 33.

The return run of the chain, which is no longer under traction, hangs along beam 5 to finally engage guiding plate 27 at the lower end of beam 5.

The swinging section 4 of the conveyor can be pivoted about drive shaft 10 by means of a double-acting hydraulic cylinder 35 pivoted at one end at 36 to the stationary beam 5, and at the other end at 37 to the free end of an arm 38 which is rigidly secured at 39 to swinging beam 9 adjacent to, and forwardly of, the pivot of swinging part 4.

Hydraulic pump 22, which powers cylinders 24, can also supply fluid under pressure to cylinder 35, which can be remote controlled by a valve, preferably located inside stable 1. Cylinder 35 can swing the swinging conveyor section 4 through about 20 degrees on the left or right hand side of the long axis of beam 5.

When section 4 is pivoted towards the right, the portion of chain 14 under traction is guided by an idle pulley 40 mounted on shaft 10 above sprocket wheel 20. When the swinging section 4 is pivoted towards the left, the portion of chain 14 under traction is guided within the troughs 16 and 17 by guides 41 and 42, secured to beams 5 and 9 respectively adjacent drive shaft 10, as shown in FIGURE 4.

Due to the large traction force exerted on the chain and, consequently, to the compression force exerted on swinging beam 9, the latter is pivoted to the stationary beam 5 by means which are independent of drive shaft 10, in order to allow free rotation of said shaft.

Figure 5:
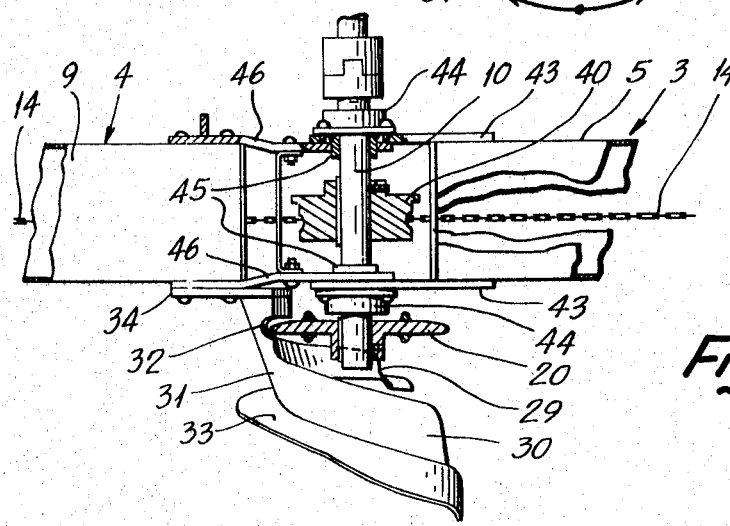
FIGURE 5 is a partial side elevation, partially in section, of the elements shown in FIGURE 4.

As shown in FIGURE 5, plates 43, which are secured to the top and bottom of the outer end of beam 5, carry bearings 44 for the shaft 10 and these bearings are provided with coaxial collars 45 freely surrounding drive shaft 10 and on which are pivoted perforated plates 46 secured to the top and bottom of the inner end of swinging beam 9.

Figure 7:
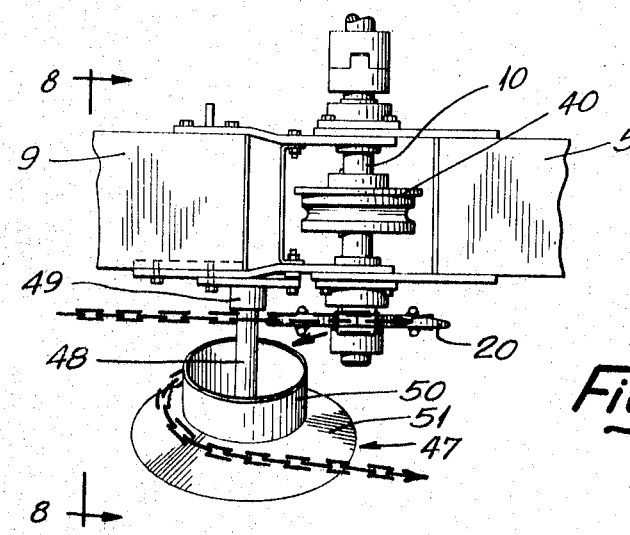
FIGURE 7 is a view similar to that of FIGURE 5, but showing another embodiment of the system for disengaging the chain from the sprocket wheel and for deviating the chain.
Figure 8:
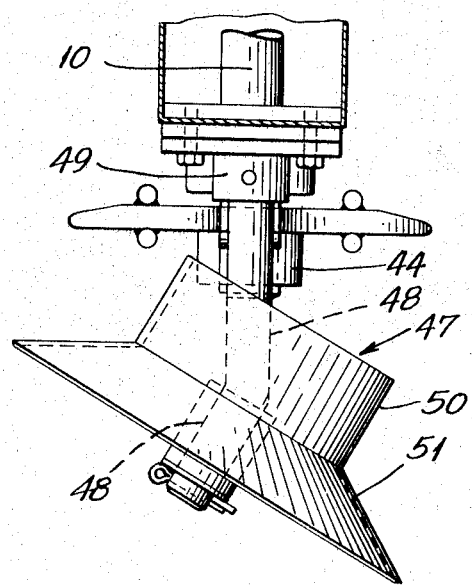
FIGURE 8 is a section taken along line 8—8 of FIGURE 7.

FIGURES 7 and 8 show a second embodiment of the element serving to disengage and deviate the chain from the sprocket wheel. The element 28 of the first embodiment is replaced by a pulley 47, which is mounted for free rotation on an angle rod 41, the upper end of which is adjustably secured in a collar 49, itself secured underneath swinging beam 9 immediately forwardly of sprocket wheel 20.

Angle rod 48 supports pulley 47 such that the axis of the latter will make an angle of about 30 degrees with the axis of driving sprocket wheel 20 in a plane transverse to the long axis of beam 9.

Idle pulley 47 comprises a cylindrical portion 50 and a lower flange 51 which is inclined at an angle of about 120 degrees with respect to the cylindrical surface 50. The cylindrical portion has a diameter which is slightly greater than the diameter of the half-circle described by the chain when engaging the teeth of the sprocket wheel.

The cylindrical portion 50 of idle pulley 47 is disposed at a level which is as close as possible to the bottom face of the teeth of sprocket wheel 20 and is inclined upwardly in the direction of the sprocket wheel zone wherein release of the chain takes place.

The chain, when leaving the teeth of the sprocket wheel, engages the cylindrical portion 50 to be displaced radially exteriorly and then falls unto and rests on the flange 51, which directs the chain downwardly for the last half-turn of the chain, whereby the latter crosses the chain run under traction without touching the same.

There is no friction between the chain and the pulley 47, because the latter is an idle pulley.

FIGURES 9 and 10 show still another embodiment of the element serving to disengage and deviate the chain. The pulley 47 of the second embodiment is replaced by a toothed wheel 5, which is secured to a bracket 54, itself secured to the beam 9 underneath the same and just forwardly of the driving sprocket wheel 20.

Rod 53 maintains the toothed wheel 52 for rotation about an axis which is inclined approximately 30 degrees with respect to the axis of rotation of sprocket wheel 20, in a plane transverse to the longitudinal axis of beam 9.

Toothed wheel 52 has preferably a diameter equal to that of sprocket wheel 20 and has the same number of teeth as the latter; wheel 52 is arranged such that its teeth, when at a maximum level, are disposed substantially in the plane passing through the driving sprocket wheel 20.

The chain links, when disengaging the teeth of sprocket wheel 20, engage the teeth of toothed wheel 52 and the latter guides the chain smoothly around about a half-circle and a spiral, in order that the return of the chain will be completely underneath the portion of the chain under traction.

The system of the toothed wheel 52 constitutes the preferred means for disengaging the chain from the sprocket wheel and deviating the same downwardly, because the chain is guided in a positive and smooth manner.

Because, in accordance with the invention the power-operated driving means for the stable-cleaning chain are mounted on the stationary portion 3 of the conveyor, the swinging portion 4 can be of light weight construction and supported from above; for example, by means of tie-rods 11 and 12, in order to completely free the underside of the swinging part 4 to facilitate movement of farm tractors and the like under the swinging part. Moreover, the system enables swinging of part 4 in an easy and quick manner, preferably by means of hydraulic cylinder 35 which, when its valve is closed, automatically blocks the swinging part in the desired angular position.

The swinging part 4, more specifically beam 9 and trough section 17, can be constituted of several sections secured in end-to-end relationship, which facilitates transport and enables to build the oscillating part to any desired length.

While preferred embodiments in accordance with the invention have been illustrated and described, it is understood that various modifications may be resorted to without departing from the scope of the appended claims.

What we claim is:

1. A discharge system for stable-cleaning apparatus comprising a first inclined beam stationarily mounted and protruding at the exterior of a stable, a second inclined swinging beam having one end pivoted to the free end of the first stationary beam, means supporting said swinging beam to form an extension of said stationary beam, but allowing swinging movement of said swinging beam, first and second trough sections carried by said stationary and swinging beams respectively and in communication with each other in the zone of pivoting of said swinging beam, a stable-cleaning conveyor chain provided with spaced scraper blades and forming a closed loop having an active run guided in said trough sections to discharge manure and the like at the outer end of said second trough section, a driving sprocket wheel mounted for rotation about an axis co-axial with the pivotal axis of said second beam, power means mounted on said first beam and connected to said driving sprocket wheel to rotate the same, the return run of said chain from the outer end of said second beam extending along said second beam and meshing with said driving sprocket wheel for about one-half turn, whereby said sprocket wheel pulls and moves said chain in its closed circuit, and means mounted on said second beam adjacent and forwardly of said driving sprocket wheel to guide the portion of the chain disengaging said sprocket wheel through about a half-turn forwardly of said sprocket wheel and to move said chain rearwardly alongside said first beam, said means guiding said chain along a spiral in said last-named half-turn, whereby the crossing portions of said chain are at different levels.

2. A system as claimed in claim 1, wherein said means consist of a guiding plate having a generally U-shaped cross-section forming legs and a bight portion, said legs and bight portion surrounding the front and sides of said sprocket wheel, said bight portion disposed just forwardly of said sprocket wheel and secured to said second beam, the leg of said guide plate disposed on the side of said sprocket wheel where disengaging of the chain from the sprocket wheel takes place, being at a higher level than the branch of said guide plate disposed on the side of said sprocket wheel where engagement of the chain with the sprocket wheel takes place, said first-named leg serving to engage the chain upon release from said sprocket wheel and to positively move said chain radially outwardly with respect to the axis of rotation of said sprocket wheel, to thereby disengage the chain links from the teeth of said sprocket wheel.

3. A system as claimed in claim 2, wherein the outer surface of the bight of said U-shaped guide plate is inclined downwardly and rearwardly with respect to the axis of rotation of said sprocket wheel.

4. A system as claimed in claim 3, further including a spiral-shaped fiange protruding radially outwardly from the lower edge of said U-shaped guiding plate and serving to support the portion of the chain disengaging said sprocket wheel and crossing the portion of the chain under tension and engaging said sprocket wheel.

5. A system as claimed in claim 2, wherein said guiding plate is secured to said second beam just forwardly of the pivoted portion of said second beam.

6. A system as claimed in claim 1, wherein said guiding means consist of an idle pulley, carried by said second beam, underneath the same and forwardly of said sprocket wheel for free rotation about an axis inclined transversely with respect to the longitudinal axis of said second beam, said idle pulley being disposed underneath and forwardly of said sprocket wheel.

7. A system as claimed in claim 6, further including an angle rod on which said idle pulley is rotatably carried, said idle rod being adjustably secured to said second beam in order to adjust the angle made by its angular portion with rsepect to the longitudinal axis of said second beam.

8. A system as claimed in claim 1, further including a guiding idle pulley mounted for free rotation on said driving shaft above said sprocket wheel and engaging and guiding the active run of said chain in the zone of pivoting of said second beam when said second beam makes an angle with said first beam.

9. A system as claimed in claim 8, further including guiding elements disposed within and carried by said trough sections in the pivotal zone of said second beam and engaging the run of said chain under tension on the side thereof opposite from the side engaged by said guiding pulley.

10. A system as claimed in claim 1, further including an A-shaped support, the inclined legs of which are supported on the ground and disposed on each side of the free end portion of said first beam and associated trough section, and supporting said beam, the apex of said A-shaped support being disposed above said free end of said beam, said means for supporting the swinging beam comprising tie-rods attached to said swinging beam and pivoted to said support at the apex thereof, said tie-rods being pivoted to said support apex about an axis co-axial with the pivotal axis of said swinging beam.

11. A system as claimed in claim 1, further including power means for pivoting said swinging beam and its associated trough with respect to said first beam and its associated trough.

12. A system as claimed in claim 11, wherein said last-named power means include an arm secured to and laterally extending from one of said beams, and a hydraulic cylinder and piston unit pivoted to the free end of said arm and to the other of said beams.

13. A system as claimed in claim 1, further including means for guiding the chain run under traction within said trough in the pivotal zone of said second beam, said last-named means including a pulley freely rotatably mounted on the drive shaft of said sprocket wheel and engageable with said chain run no one side thereof, and guiding elements secured to said beams forwardly and rearwardly of the axis of pivoting of said second beam and engageable with said chain run on the side opposite to said idle pulley.

14. A system as claimed in claim 1, wherein said last-named means include a toothed wheel carried by said second beam underneath the same and just forwardly of said sprocket wheel and rotatable about an axis of rotation which is transversely inclined with respect to said second beam.

15. A system as claimed in claim 14, wherein said toothed wheel has a dimaeter substantially equal to, and has a number of teeth subtsantially equal to, the diameter and number of teeth of said sprocket wheel respectively.

16. A system as claimed in claim 15, wherein the teeth of said toothed wheel in their highest position are disposed substantially in the plane of said sprocket wheel.

No references cited.

EVON C. BLUNK, *Primary Examiner.*
R. E. AEGERTER, *Assistant Examiner.*